M. HOUDAILLE.
SYSTEM FOR THE PROGRESSIVE REGULATION OF THE FLEXIBILITY OF A LAMINATED SPRING.
APPLICATION FILED DEC. 7, 1912.
1,200,194.   Patented Oct. 3, 1916.
3 SHEETS—SHEET 1.
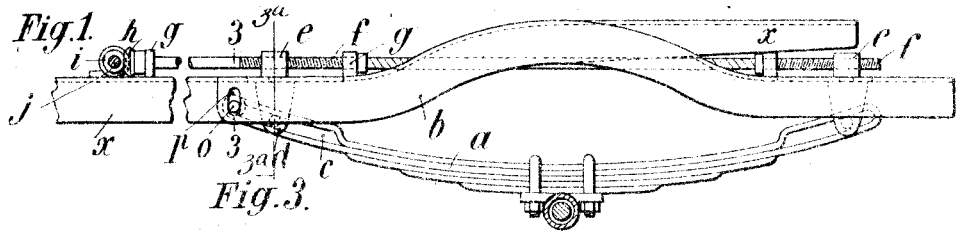
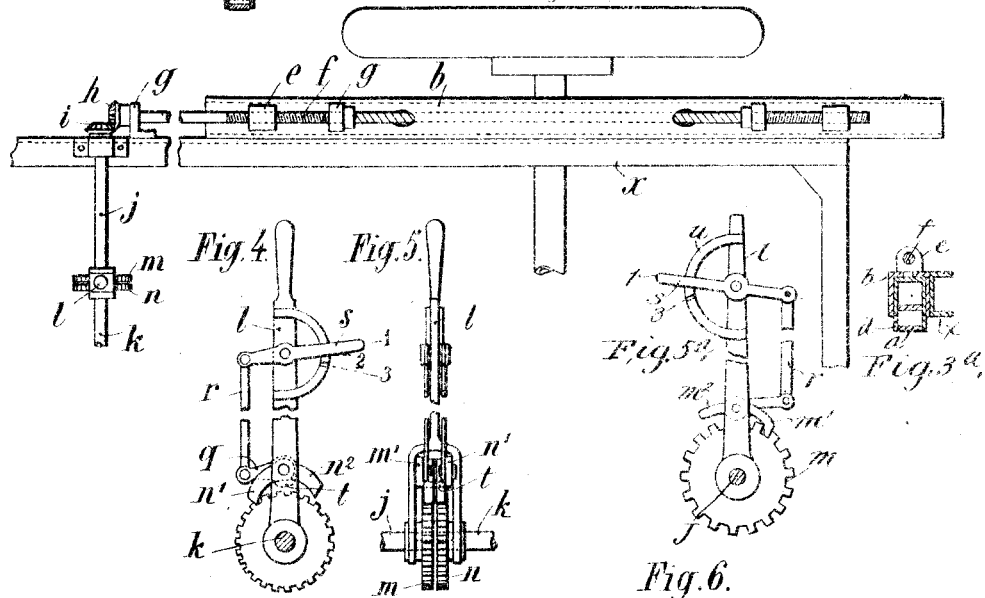
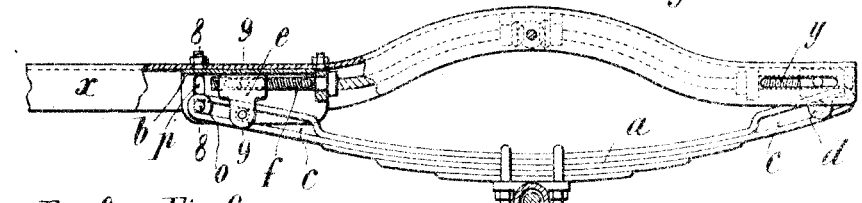
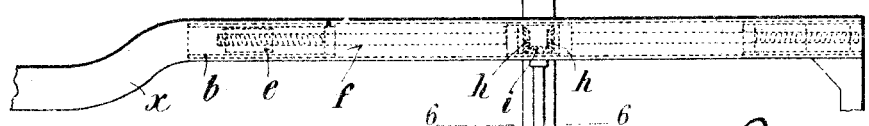

M. HOUDAILLE.
SYSTEM FOR THE PROGRESSIVE REGULATION OF THE FLEXIBILITY OF A LAMINATED SPRING.
APPLICATION FILED DEC. 7, 1912.

1,200,194.

Patented Oct. 3, 1916.
3 SHEETS—SHEET 3.

Witnesses
W. K. Boulter
P. R. Smith

Inventor
Maurice Houdaille
By Wm. E. Boulter,
Attorney

UNITED STATES PATENT OFFICE.

MAURICE HOUDAILLE, OF LEVALLOIS-PERRET, FRANCE.

SYSTEM FOR THE PROGRESSIVE REGULATION OF THE FLEXIBILITY OF A LAMINATED SPRING.

1,200,194.  Specification of Letters Patent.  Patented Oct. 3, 1916.

Application filed December 7, 1912. Serial No. 735,527.

*To all whom it may concern:*

Be it known that I, MAURICE HOUDAILLE, a citizen of the French Republic, residing at Levallois-Perret, in France, have invented a certain new and useful System for the Progressive Regulation of the Flexibility of a Laminated Spring, of which the following is a specification.

This invention relates to a system for the progressive regulation of the flexibility or resiliency of laminated springs chiefly used for the suspension of vehicles.

The invention chiefly consists in varying the chord of the spring so as to bring its resiliency in accordance with the load to be carried and relates more particularly to means enabling the suspension hangers of the spring to be mounted in such manner that they should be able to slide, on the one hand, on the frame of the vehicle carrying the said hangers, and on the other hand, on the ends of the springs which the said hangers connect to the frame. The invention also comprises means for controlling the movements of one or both suspension hangers of one and the same pair of springs, or of springs of one and the same vehicle, either simultaneously or separately.

The invention also relates to the means for controlling deformation of the springs under the action of different loads, by measuring the curvature of the said springs, so as to make a better regulation of their flexibility possible. The invention also comprises means for obtaining previous adjustment, and also automatic adjustment by the bending movements of the spring itself.

Figure 10:
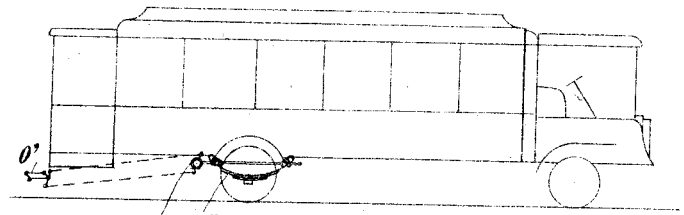
Figure 11:
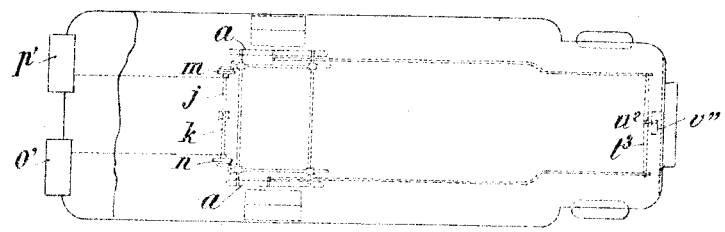
Figure 12:
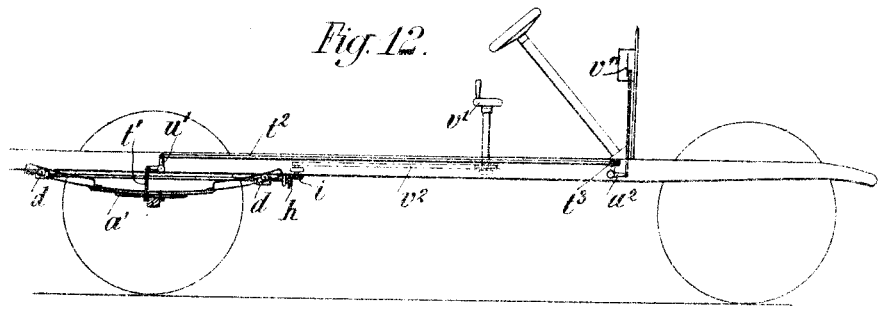
Figure 13:
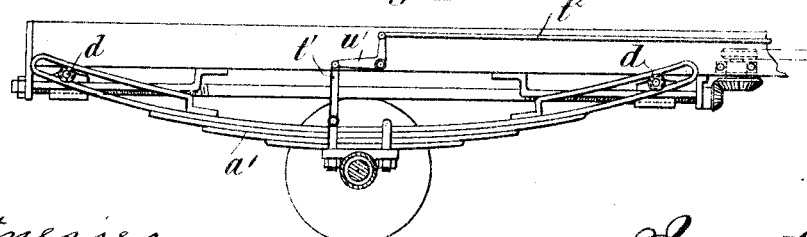
Figure 14:
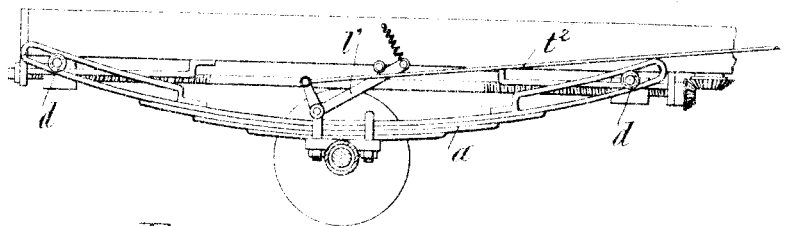
Figure 15:
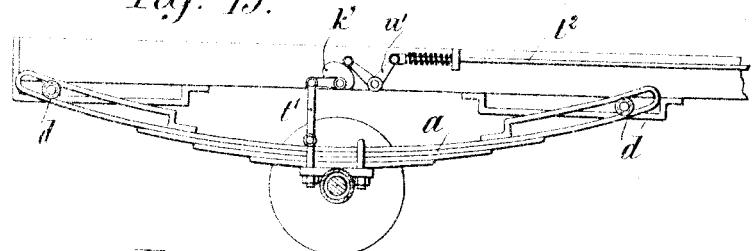
Figure 16:
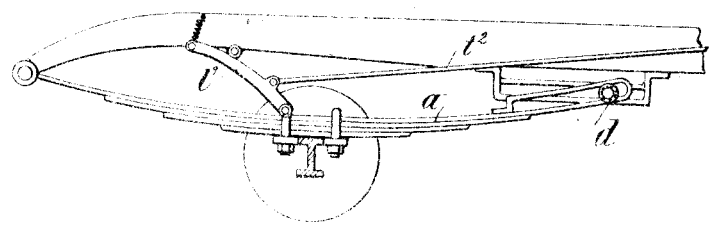
Figure 17:
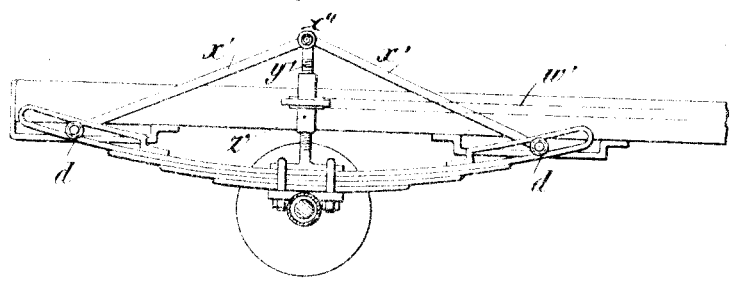

In the accompanying drawings given by way of example: Figure 1 shows in side elevation the rear part of a motor-car frame constructed in accordance with one of the methods of carrying out the invention, in which the suspension hangers are arranged in boxes laterally secured to the longitudinal members of the vehicle. Fig. 2 is a plan corresponding to Fig. 1. Fig. 3 is a cross-section on the line 3—3 of Fig. 1. Fig. 3ª is a vertical sectional view on the line 3ª—3ª of Fig. 1. Fig. 4 is a front elevation and Fig. 5 is a side elevation of one construction of the operating lever shown on an enlarged scale. Fig. 5ª is a side elevation similar to Fig. 4, looking in the direction opposite to that of said Fig. 4. Fig. 6 is a view similar to Fig. 1, of another construction in which the suspension hangers are arranged in the interior of the longitudinal members which themselves are designed for the purpose. Fig. 7 is a partial plan of the arrangement shown in Fig. 6. Figs. 8 and 9 are cross-sections respectively on the lines 8—8 and 9—9 of Fig. 6. Figs. 10 and 11 show diagrammatically, in elevation and plan, a motor omnibus which is adapted automatically to adjust the springs according to the weight of the passengers. Fig. 12 shows in elevation a motor car frame in which the adjustment can be effected at will by the driver, in combination with an indicator of the curvature given to the springs by the load. Fig. 13 shows on an enlarged scale a portion of the construction shown in Fig. 12. Figs. 14–16 show in elevation various constructions of the parts connecting the spring to the curvature indicator. Fig. 17 shows, also in elevation, a construction according to this invention, in which the regulation of the flexibility of the spring is effected both beforehand and automatically during its operation.

In the construction shown in Figs. 1–3, the main blade of the spring is provided at its ends with slots through and in which rollers are adapted to travel, the pins of these rollers being supported by shackles $d$ $d$ constituting the suspension hangers connecting the spring to the frame of the vehicle. These shackles $d$ are arranged so as to slide without play in the boxes $b$ which are rigidly secured against the longitudinal members of the frame. Each of the said shackles is connected, by means of a pin sliding in a groove of the box $b$, to a nut $e$ through which passes a screw thread cut at the corresponding end of a rod $f$ suitably supported in bearings $g$ secured to the box $b$.

Through one of the ends of each laminated spring $a$, preferably that facing the front of the vehicle, passes a pin $o$, the ends of which can slide vertically in elongated openings $p$ provided in the corresponding box $b$. Owing to that arrangement, the end of each spring $a$ is rigidly connected to the frame in the horizontal direction of the thrust strains transmitted to it by the axle of the wheels, while at the same time it can slide vertically in the groove $p$, according to the position of adjustment given to the said end.

At one of their ends, the rods $f$ are extended and provided with a bevel pinion $h$ in gear with another bevel pinion $i$ carried by a spindle $j$ which is continued by another spindle $k$ carrying the bevel pinion $i$ which operates the device for regulating the flexibility of the spring $a$ on the other side.

In order to enable the two springs of one and the same axle to be simultaneously or separately adjusted, the two spindles $j$ and $k$ are arranged in line with each other and so that they can rotate either together, or separately, and in both directions. To that end, these two spindles are provided respectively with ratchet wheels $m$ and $n$ with teeth arranged so that two pawls $m^1$, $m^2$ or $n^1$ or $n^2$ arranged in a direction opposite to each other, and in pairs at each side of the lever $l$, can engage with the said ratchet wheels, according to the direction in which they are pivoted. These pawls are freely pivoted to the pivot pin of small oscillating levers $q$ arranged at each side of the lever $l$, and controlled by the action of springs having the tendency to keep them in contact with a tail or projection of the said levers $q$. Each of the said levers $q$ is connected by a rod $r$ to a handle $s$ constituted by a flexible blade engaging, owing to lateral pressure, with one or the other of the three notches 1, 2, 3, made in a quadrant $u$ arranged near the handle of the lever $l$.

The working of this construction, shown in Figs. 1–5, and 5$^a$ is as follows: In order to regulate simultaneously the two springs of one and the same couple, the operator first places the respective control handles of the two pairs of pawls $m^1$ $m^2$ and $n^1$ $n^2$ into the same notches 1 or 3 of the corresponding quadrants $u$, according to the direction in which he wishes to rotate the two spindles $j$ and $k$, and then gives a reciprocating movement to the lever $l$. During that movement, that one of the two pawls of each pair which has come into engagement with the corresponding ratchet wheel, drives the latter wheel as well as its spindle, in an intermittent rotary motion. This motion is transmitted simultaneously and in the same direction to the two spindles $j$ and $k$, which brings about simultaneous movement of the nuts $e$, and consequently of the suspension hangers of the two springs $a$ of the same axle. During these various movements, the suspension hangers of one and the same spring move in the direction opposite to each other, in order to move them away from or nearer to each other, according to the adjustment to be obtained. The movement of the suspension hangers will be to bring them nearer to each other when the vehicle is to bear a heavier load, and in the opposite direction when the said load is reduced. In order to regulate one of the springs independently of the other, the operator places into the central position, the handle controlling that one of the two hangers which must not be operated, and then inclines the other into the position corresponding to that desired for bringing about the movement of the hangers of the spring to be regulated. By inclining one of the handles in one direction, and the other handle in the opposite direction, the pawls will act alternately on the respective ratchet wheels of the two spindles $j$ and $k$, so as to turn them simultaneously in opposite directions, which brings about the adjustment of the two springs by increasing and reducing inversely their respective flexibilities.

In the modified construction shown in Figs. 6–9, the same regulation of the flexibility of the springs is effected, but with the difference that the boxes $b$ are arranged in the interior of the space formed by the longitudinal members $x$ which are shaped for the purpose. In this construction, the boxes $b$ are provided with grooves $y$ into which slide projections provided on the nuts $e$ and forming guides for the suspension hangers $d$. The movement of the said hangers $d$ is obtained by means of flexible shafts arranged in the interior of the longitudinal members and operated in the same manner as in Figs. 1–5. Regulation of the suspension hangers for modifying the chord of the springs, can be also effected by means of an auxiliary hand wheel $v'$ transmitting the movement to the bevel pinion by means of a chain $v^2$, as shown in the construction Fig. 12. The flexibility of a spring can also be automatically regulated either by the load itself, or during the working of the spring.

The application to a motor omnibus, illustrated by way of example in Figs. 10 and 11, shows that the said automatic regulation can be obtained owing to the weight of the passenger (calculated on the average, say at 70 kg. each.) To that end, the rear platform of the vehicle can be provided with two independent foot boards $o'$ $p'$ for the passengers, one intended for getting on, and the other for getting off. These two foot boards are connected respectively by rods and levers to the pawls driving the ratchet wheels $m$ $n$ dependent on the spindle $j$ $k$. When a passenger, on getting into the vehicle, lowers one of the foot boards, for instance the foot board $o'$, it acts on the transmission of movement for automatically reducing the chord of the said springs and bringing their flexibility in accordance with the new weight added to the load. When, on the contrary, a passenger descends from the vehicle, by passing over the other foot board, the one marked $p'$, he acts so as to increase automatically the chord of the springs.

For vehicles in which the adjustment is effected from the driver's seat, or from any other point, by means of suitable control parts acting on the whole of the springs, the curvature of the latter is shown by means of any indicator placed in a clearly visible manner in front of the driver, the position of the said indicator depending on the bending movements of the said springs.

In the position shown by way of example in Figs. 12 and 13, each spring $a'$ is connected in the center by means of rods $t'$ $t^2$ and bell-crank levers $u'$ $u^2$ to the hand $v''$ of a dial arranged on the front dash-board of the vehicle. The connecting rods $t^2$ of the two springs of one and the same axle, are connected to the bell-crank lever $u^2$ acting on the hand, by means $t^3$ which transform the differential movements of the two springs into an average travel. The springs could also be connected to separate indicators. In those conditions, the springs being calculated so as to retain a given curvature under any loads which they may have to bear, the indicator hand $v''$ will indicate the extent of the adjustment which must be effected for bringing the spring to its normal curvature when the load varies. This adjustment can be effected by the driver from his seat, by means of the wheel $v'$, in accordance with the exact value desired, simply by reading the indicator dial, after each loading or unloading. The hand of the dial could be rendered, if desired, independent of the movement of the springs, and brought into engagement with the same during the adjustment.

In cases in which it may be considered necessary that the curvature of the springs should change in accordance with the chord, in a given proportion, the variation in question can be obtained by giving for instance to the hand $v''$ a curve of movement similar to the curve of difference of flexibility. Thus, for instance, instead of the movement of the springs being transmitted in a uniform manner to the indicator dial, as in the case of springs with a constant curvature (Figs. 13 and 14), the movement in question could be transmitted so as to obtain the desired proportion between the curvature of the spring and its chord, according to the adjustment given to the latter. In the construction of such a transmission shown in Fig. 15, the variation in question is obtained by means of a cam $k'$ of a given cross-section, inserted between the spring $a$, and the indicator hand. By acting by hand on the rod $t^2$ connecting the indicator to the lever $u'$ coming into contact with the cam $k'$, the lever in question and the cam could be separated from each other, in such manner that the indicator hand would work only when desired and at the moment desired.

In the construction shown in Figs. 14 and 16, the variation in question is given by a lever $l'$ on which acts directly the chassis during the deformation of the spring. Automatic adjustment of the resiliency of a laminated spring, can also be obtained by the variation of the respective positions of its points of support, obtained during its working and by its various bending movements.

Fig. 17 shows by way of example a construction, by means of which the said automatic regulation can be effected. In that construction, the points of support $d$ of the springs are connected together by rods $x'$ pivoted to each other. The joint of the rods $x''$ is connected to the center of the spring by a tie $y'$, the length of which can be varied by means of a turnbuckle $z'$ coöperating with screwthreaded portions on the tie $y'$.

By rotating the turnbuckle $z'$ in the one or in the other direction, the tie $y'$ is lengthened or shortened, and consequently the chord of the spring can be adjusted beforehand to suit the initial resiliency that is to be given to it under a given load. This preliminary adjustment having been effected, the movements of the spring itself will themselves automatically modify its chord, so as to bring its flexibility in accordance with its bending movement. In fact, under the action of shocks, the tie $y'$ will act on the rods $x'$ and have the tendency to reduce the chord of the spring during the compression period, and to increase it during the expansion period. The result will be therefore that the resiliency of the spring will be automatically varied during the working, and will be always brought in accordance with the deformation of the said spring, whatever be the shock which it may experience.

In the construction shown in Fig. 17, previous adjustment of resiliency is effected by means of a chain $v'$ in accordance with the bending movements of the spring, the said chain being operated by the driver by means of any suitable gear. In the construction shown in Fig. 17, one of the hangers $d$ can be connected to the indicator dial, without it being necessary to insert any other intermediate parts.

The variation of resiliency of the spring may be obtained at only one of the points of support of the spring, arranged in an adjustable manner in accordance with this invention, the other point of support always remaining fixed as shown in the construction Fig. 16. This construction makes it possible to do away with the ordinary thrust leg usually employed for connecting the axle to the frame. This arrangement is also applicable to the springs of front steering wheels of a vehicle, and to rear driving wheels, the construction being identically the same, the front suspension hanger being arranged so as to be guided horizontally for the variation of the chord of the spring, and vertically for the thrust of the frame by the said spring.

In all its constructions, the invention is easily applicable to the compensated suspension of vehicles with load varying to a great extent, and makes it possible always to bring the resiliency of the springs in accordance with the said loads, so as to deaden the oscillations.

What I claim as my invention and desire to secure by Letters Patent is:—

1. In a device for regulating the flexibility of laminated vehicle springs connected to the frame of the vehicle, the combination of suspension hangers sliding in slots arranged in the ends of the main leaf of the spring, guides secured to the frame of the vehicle for guiding the suspension hangers longitudinally, and rods connecting the two suspension hangers for simultaneously displacing the said hangers apart.

2. In a device for regulating the flexibility of laminated vehicle springs connected to the frame of the vehicle, the combination of suspension hangers sliding in slots arranged in the ends of the main leaf of the spring, guides secured to the frame of the vehicle for guiding the suspension hangers longitudinally, rods connecting the two suspension hangers for simultaneously displacing the said hangers apart and means for actuating the said rods and adjusting the relative position of the hangers according to the load.

3. In a device for regulating the flexibility of laminated vehicle springs connected to the frame of the vehicle, the combination of suspension hangers formed by rollers moving in slots at the ends of the main leaf of the spring, guides secured to the vehicle frame for guiding the suspension hangers longitudinally to the said frame, rods oppositely screwthreaded at their ends, a bevel gear to actuate the said screwthreaded rods and to regulate simultaneously the position of the suspension hangers, means for actuating the said bevel gear in the direction in which the suspension hangers are to be moved, a dial indicator for reading the elasticity of the spring under different loads, and a pivoted link and lever gear connecting the said springs with the indicator dial.

4. In a device for regulating the flexibility of laminated vehicle springs connected to the frame of the vehicle, the combination of suspension hangers formed by rollers moving in slots at the ends of the main leaf of the spring, guides secured to the vehicle frame for guiding the suspension hangers longitudinally to the said frame, rods oppositely screw-threaded at their ends, a bevel gear to actuate the said screw-threaded rods and to regulate simultaneously the position of the suspension hangers, means for actuating the said bevel gear in the direction in which the suspension hangers are to be moved, a dial indicator for reading the elasticity of the spring under different loads, and means arranged intermediate the springs and dial indicator and actuated by said springs for the purpose set forth.

5. In a device for regulating the flexibility of laminated vehicle springs connected to the frame of the vehicle, the combination of suspension hangers formed by rollers moving in slots at the ends of the main leaf of the spring, guides secured to the vehicle frame for guiding the suspension hangers longitudinally, a spindle having oppositely screw-threaded ends connecting the suspension hangers, a bevel gear actuating the said screw-threads and simultaneously adjusting the relative position of the hangers, a control lever adapted to oscillate around the spindle of one of the bevel gear wheels, two ratchets with oppositely arranged teeth secured to said spindle, two oppositely arranged pawls secured to each other and acting on the two ratchet wheels respectively, a handle arranged on the controlling lever and connected to the pawls to actuate one of the latter, a dial with an indicating hand arranged in front of the driver of the vehicle, a transmission comprising rods and levers connecting said hand to means which transform the movement of two springs into an average travel, two connecting rods connecting the ends of said means to bell-crank levers arranged at each side of the frame, a cam which can oscillate on the longitudinal members of the frame above each spring, and a lever contiguous to the said cam and to a connecting rod connecting the said lever to each spring.

6. In a device for regulating the flexibility of laminated vehicle springs connected to the frame of the vehicle, the combination of suspension hangers formed by rollers moving in slots arranged on the ends of the main leaf of the spring, guides secured to the vehicle frame for guiding the suspension hangers longitudinally, a spindle having oppositely screw-threaded ends connecting the two suspension hangers, a bevel gear for actuating the said screw-threads and simultaneously adjusting the relative position of the hangers, two ratchet wheels with oppositely arranged teeth keyed to the shaft of the bevel gear, two pawls adapted to act oppositely on the two ratchet wheels, two foot boards connected respectively to the said ratchet wheels and operating the bevel pinions in the desired direction for bringing about the regulation of the position of the hangers according to the load on the vehicle, a dial indicator for enabling the control of the elasticity of the spring under the different loads and a connection comprising rods and levers hinged between the springs and the said indicating dial with the interposition of a cam.

In testimony whereof I have signed my name to this specification in the presence of two subscribing witnesses.

MAURICE HOUDAILLE.

Witnesses:
 HANSON C. COXE,
 GEORGES BONNEUIL.